Jan. 1, 1924. 1,479,185
C. C. KINT
LATCH FOR CLUTCH PEDALS
Filed Nov. 7, 1921
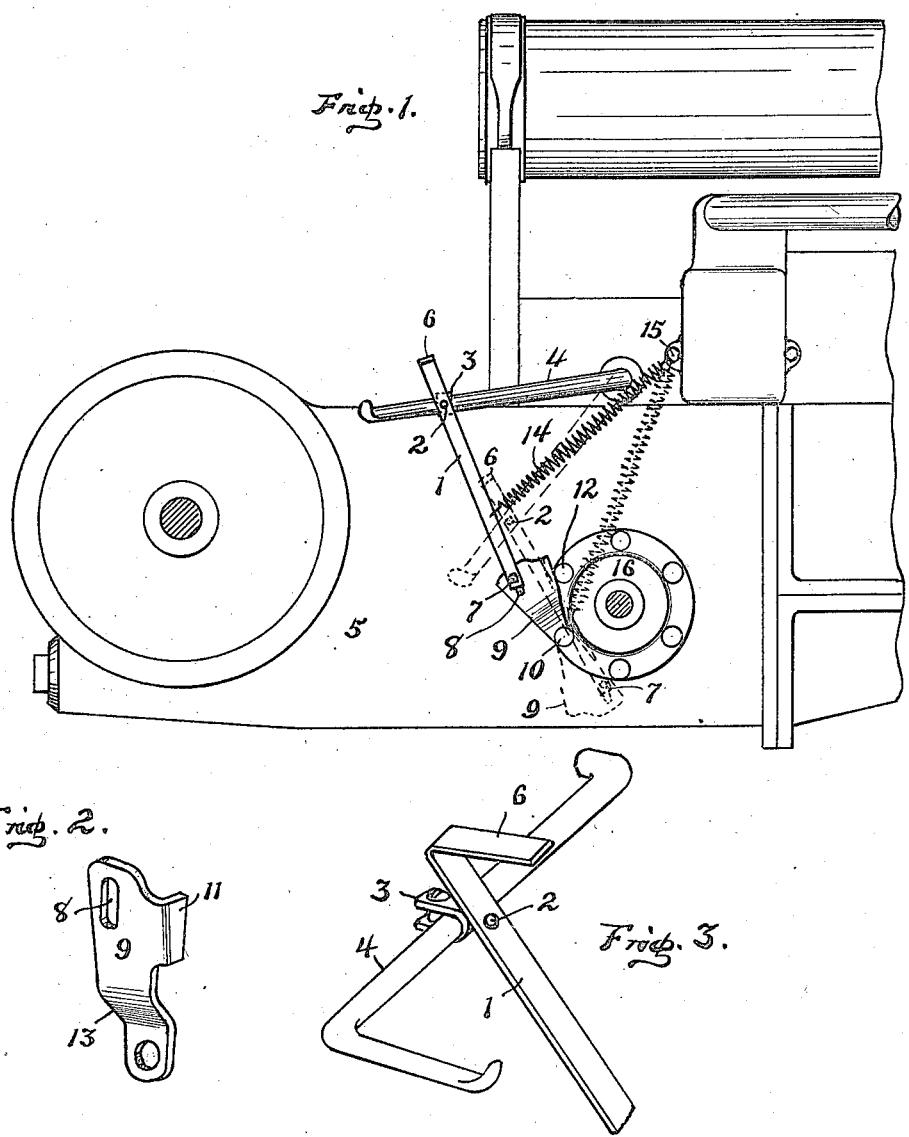
Carl C. Kint,
By W. G. Burns Patented Jan. 1, 1924.

1,479,185

UNITED STATES PATENT OFFICE.

CARL C. KINT, OF RAY, INDIANA.

LATCH FOR CLUTCH PEDALS.

Application filed November 7, 1921. Serial No. 513,296.

*To all whom it may concern:*

Be it known that I, CARL C. KINT, a citizen of the United States of America, and resident of Ray, in the county of Steuben and State of Indiana, have invented certain new and useful Improvements in Latches for Clutch Pedals, of which the following is a specification.

This invention relates to improvements in latches for clutch pedals and is especially applicable to tractors having a clutch mechanism controlled by a pedal, and the object of the invention is to provide means for automatically securing the clutch pedal so that the clutch will be held out of gear when so desired, and also to provide a convenient means for releasing the pedal thus secured.

The above object is accomplished by the construction illustrated in the accompanying drawings in which:—

Fig. 1 is a side elevation of a tractor in part showing the invention applied thereto, the pulley shaft and axle being shown in cross section;

Fig. 2 is a detail view in perspective showing the pivotal link; and

Fig. 3 is a detail view in perspective showing a portion of the lock lever in connection with the clutch pedal of the tractor.

The characters appearing in the description refer to parts shown in the drawings and designated thereon by corresponding characters.

The invention comprises a lock lever 1 mounted upon a pivot 2 that extends from a clamp 3 which is secured to the shank of the clutch pedal 4 of the tractor 5, the upper end 6 of the lock lever being bent at an angle to form a pedal for its operation. The lower end of the lock lever has a bolt 7 secured thereto that has sliding connection in a slot 8 in the link 9, and the link has pivotal connection at its end opposite the slot with the bolt 10 on the side of the tractor. The link 9 has also an ear 11 adapted to come into contact with the bolt 12 on the side of the tractor so that its upward swinging movement is thereby limited. An offset 13 is made in the link at a point between the slot 8 and its lower end so that the lock lever pivoted to the link is held in a plane apart from that of the head of the bolt 10 which permits the lock lever to clear the bolt 10 in its movement to lowermost position indicated in dotted outline in Fig. 1. A retracting spring 14 has connection at one of its ends with the lock lever at a point thereon between its pivotal connections and at its opposite end with the bolt 15 on the side of the tractor at a point ahead of the clutch pedal. The link 9 is so shaped and the lock lever is so positioned on the clutch pedal that the sliding connection 7 between the lock lever and link is prevented from coming into alinement between the pivot 2 and bolt 10, when the link reaches the limit of its upward movement. The slot 8 in the link permits limited independent movement of the lock lever relative to the link, when the clutch pedal is manipulated to a correspondingly limited extent. The spring 14 tends to draw the pendent end of the lock lever forward so that when the clutch pedal is depressed to its lowermost position, the pivotal connection 7 is carried to a point beyond the plane that extends through the pivot 2 and bolt 10, the lock lever being limited in its forward swinging movement by coming into contact with the bearing bracket 16 on the tractor. Thus, the connection 7 in its movement to lowermost position passes the dead center or point of alinement with the bolt 10 and pivot 2.

In the operation of the invention the clutch pedal may be manipulated in the usual manner to a sufficient extent merely to throw the clutch out momentarily by moving the pedal downwardly part way. However, when it is desired to sustain the clutch out of gear the pedal is depressed sufficiently to permit the connection 7 to pass dead center so that the lever bears against the bracket, in which position it is sustained by the spring 14. When the parts are thus positioned, the clutch pedal is held from retracting. By applying forward pressure against the upper end 6 of the lock lever 1, the connection 7 will be moved backwardly past dead center so as to permit the link to swing upwardly to its former position and thus relieve the detention of the clutch pedal.

In using the invention in this manner the tractor clutch may be left either in or out of engaging position accordingly as the clutch pedal and lock lever are manipulated.

What I claim is:—

In a clutch pedal latch for tractors, a link having pivotal support at one end thereof and an elongated slot at the other end and adapted to have limited swinging movement in each direction; a lock lever having pivotal connection with the clutch pedal of the tractor and a sliding connection in the slot of the link; and a tension means engaging the lock lever tending to sustain the link in its opposite positions.

In testimony whereof I affix my signature, in presence of two witnesses.

CARL C. KINT.

Witnesses:
MATILDA METTLER,
WALTER G. BURNS.